United States Patent [19]

Lill

[11] Patent Number: 5,182,614

[45] Date of Patent: Jan. 26, 1993

[54] TWO-DIMENSIONAL PROFILE DETECTION SYSTEM

[75] Inventor: Melvin H. Lill, San Jose, Calif.

[73] Assignee: FMC Corporation, Chicago, Ill.

[21] Appl. No.: 648,066

[22] Filed: Jan. 31, 1991

[51] Int. Cl.⁵ .............................................. G01B 11/24
[52] U.S. Cl. .................................................. 356/376
[58] Field of Search ........................................ 356/376

[56] References Cited

U.S. PATENT DOCUMENTS

| | | | |
|---|---|---|---|
| 4,180,326 | 12/1979 | Chang | 356/152 |
| 4,875,777 | 10/1989 | Harding | 356/376 |
| 4,894,551 | 1/1990 | Kishimoto et al. | 356/376 |

FOREIGN PATENT DOCUMENTS

| | | | |
|---|---|---|---|
| 81514 | 4/1987 | Japan | 356/376 |
| 55907 | 2/1990 | Japan | 356/376 |

*Primary Examiner*—Richard A. Rosenberger
*Attorney, Agent, or Firm*—H. M. Stanley; R. C. Kamp; R. B. Megley

[57] ABSTRACT

The invention disclosed herein relates to a detection system for a profile line on an observed body which uses a linear array of sequentially energized energy beam emitters to project beams toward the body. Reflections of the beams are detected by a linear array of energy beam receivers which monitor wedge shaped sectors within a field of view. The known sequence of beam projection and the known sector of reception of reflected beams are used to identify points in space on the profile line.

6 Claims, 2 Drawing Sheets

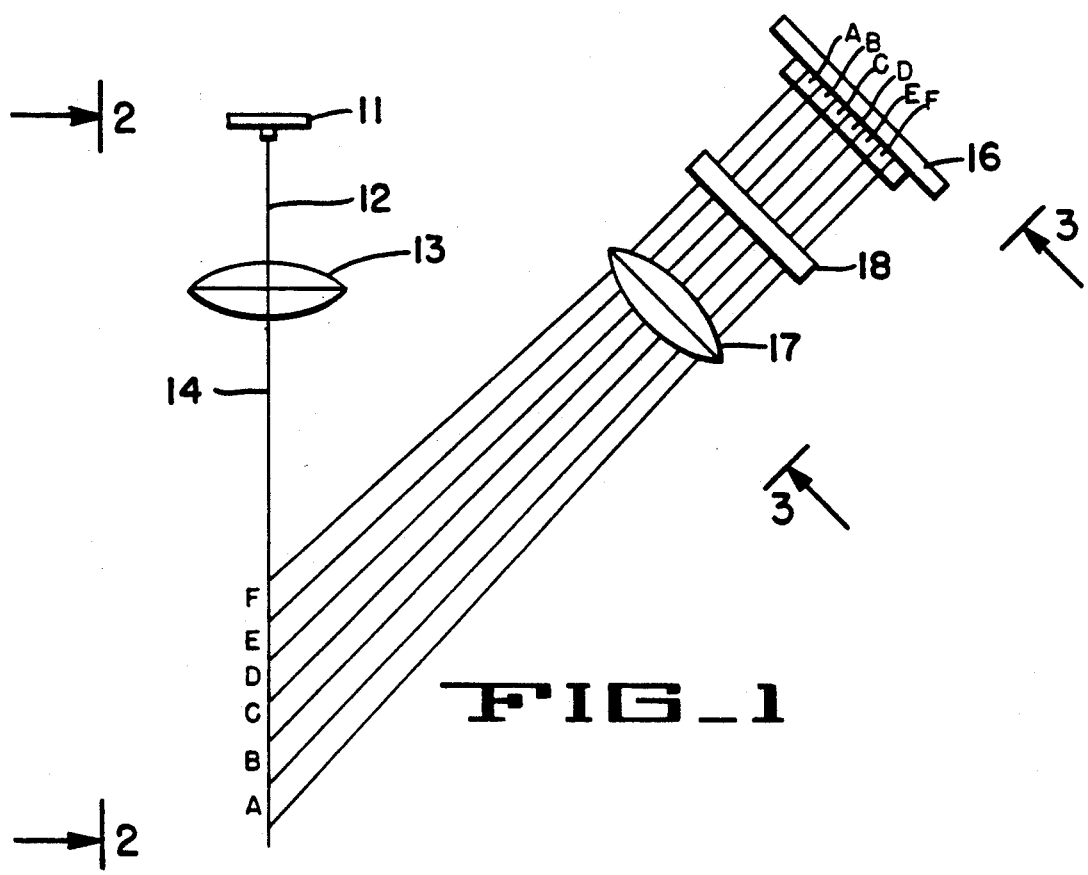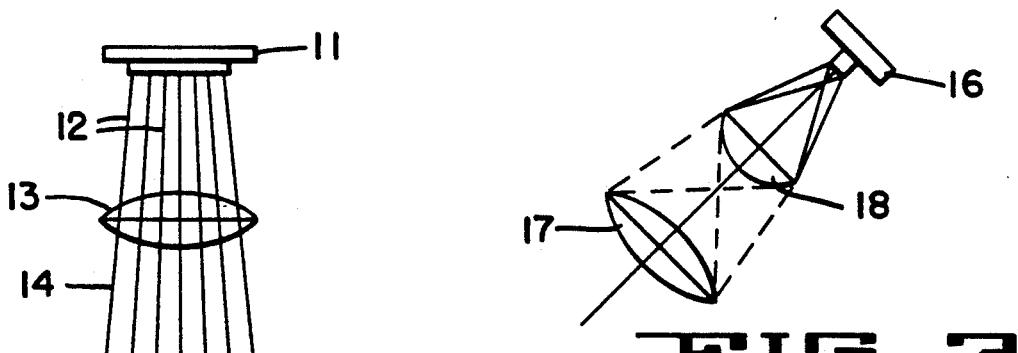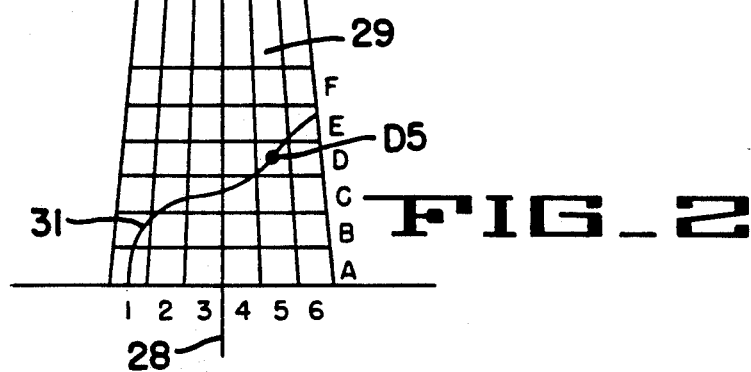

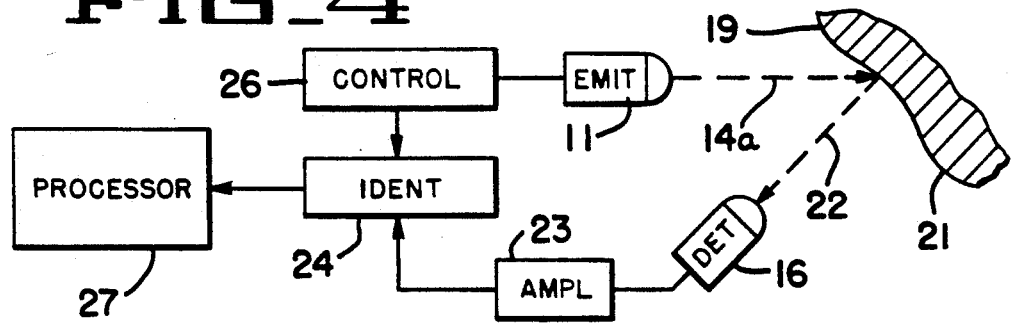
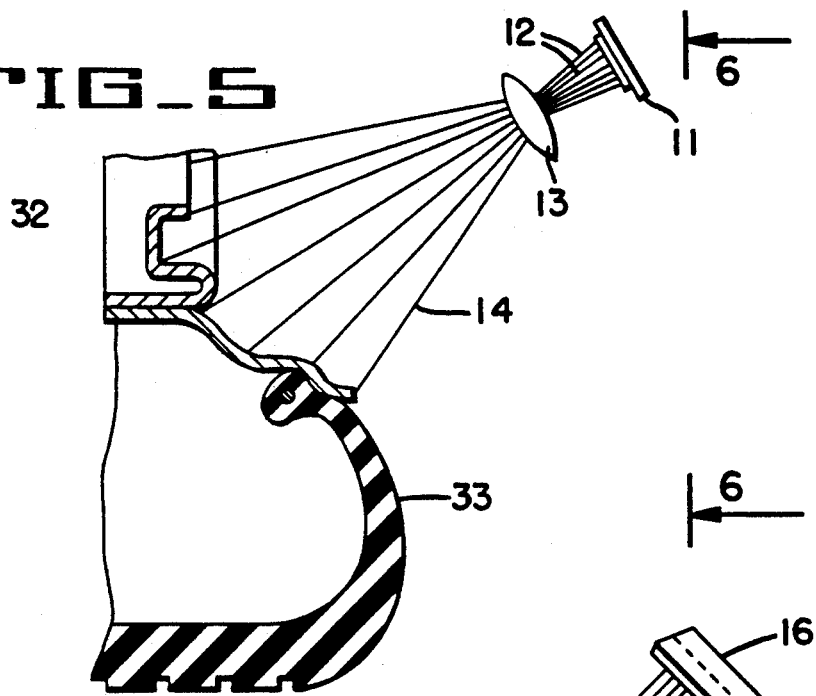
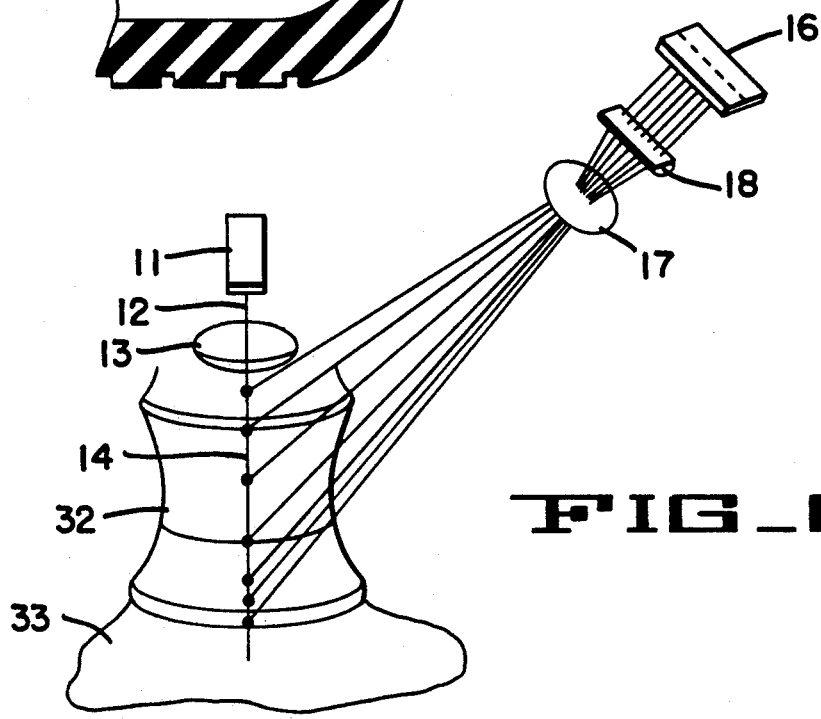

TWO-DIMENSIONAL PROFILE DETECTION SYSTEM

SUMMARY OF THE INVENTION

This invention relates to a system for detecting a two-dimensional profile on a body within a field of view which includes a plurality of energy emission means for emitting a plurality of energy emission beams in a known pattern within the field of view and projector lens means which are interposed between the plurality of energy emission means and the body for focusing the beams within the field of view. Further, excitation means is provided for individually exciting the plurality of energy means in a predetermined sequence and for providing excitation indicative signals corresponding thereto. The energy beams impinge upon and are reflected by the body and are thereafter received by a plurality of detector means for defining discrete sectors within the field of view and for individually receiving reflected energy beams within one of the sectors and providing detector output indicative thereof. Detector lens means is interposed between the body and the plurality of detector means for focusing reflected energy within the field of view on the plurality of detector means. Means for receiving the detector output and the excitation indicative signals and for providing output descriptive of the two dimensional profile is included.

The invention disclosed herein involves a two dimensional profile detection apparatus for detecting a body profile within a field of view and includes a plurality of energy emitting means arranged in linear array and projecting a plurality of individual energy beams toward the body when energized. Emitter lens means is provided for focusing the individual energy beams within the field of view, control means is provided for energizing the plurality of energy emitting means in predetermined sequence so that the energy beams impinge the body and are reflected therefrom within the field of view. A plurality of detector means is arranged in linear array exposed to the field of view and individually exposed to a sector within the field of view. Detector lens means is included which is interposed between the body and the plurality of detector means for focusing the individual energy beams reflected from the body onto the linear array of detector means. As a result one of the individual detector means within the plurality thereof which is impinged by one of the reflected individual energy beams from an individual sector produces a discrete detector output signal. Means is also included for conditioning and identifying each of the discrete detector output signals to identify the individual energy beams reflected from the body and the sector from which it is received.

The method of the present invention relates to a method for detecting a two-dimensional profile on a body situated within a field of view and includes the steps of projecting a plurality of energy beams toward the field of view from ones of an array of beam projectors in a substantially planar beam array and in a predetermined projection sequence. The method includes the step of detecting the energy beams reflected from the surface of the body within the field of view with an array of beam detectors and shaping the reflected energy beams so that individual ones of the beam detectors in the array receive reflected energy from substantially only one sector in the field of view, thereby providing a detector output upon receipt of the reflected beam energy. Also included are the steps of identifying the projected beam reflection producing the beam detector output by reference to the predetermined projection sequence and identifying the sector of impingement within the field of view by reference to the output from the one impinged detector, whereby a series of discrete locations along the two dimensional profile is obtained.

BRIEF DESCRIPTION OF THE DRAWINGS

FIG. 1 is a diagram of one arrangement of an emitter and detector in the present invention.

FIG. 2 is a diagram of the emitter portion of FIG. 1 taken along the line 2—2 of FIG. 1.

FIG. 3 is a diagram of the detector portion of FIG. 1 taken along the line 3—3 of FIG. 1.

FIG. 4 is a block diagram of the present invention showing the signal processing and control features of the system.

FIG. 5 is a sectional view of one application of the present invention.

FIG. 6 is a view taken along the lines 6—6 of FIG. 5.

DESCRIPTION OF THE PREFERRED EMBODIMENT

The invention disclosed herein is a non-contact profile measuring system which automatically locates certain profile characteristics on a body located within the system field of view. Such a system is useful in the location and identification of wheel rim surfaces and features when a wheel rim and tire assembly is mounted on an automotive wheel balancer for detecting and indicating the correction for wheel assembly unbalance. Such a system must operate in high ambient light levels and environments containing potentially high levels of airborne contaminants.

FIG. 1 shows the disclosed invention in diagrammatic form, wherein an emitter assembly 11 contains a linear array of energy beam emission devices such as light emitting diodes. The linear array is seen on end in FIG. 1 and is caused to sequentially energize the light emitting diodes to provide a line of projected beams 12. A projection lens 13 is set in the path of the sequentially projected line of beams 12 to cause the beams to extend in a fan-like shape 14, as best seen in FIG. 2. The edge of the fan-like array of sequentially projected beams 14 is seen in FIG. 1 as the edge of a plane set perpendicular to the plane of the paper.

A linear array of detectors, such as photo diodes or solar cells 16 as shown in FIG. 1 having, purely for purposes of explanation, detectors A through F. Each of the detectors in the linear array 16 is exposed to a wedge-like sector within a field of view of the detector array 16 through a detector lens system including an objective lens 17 and a cylindrical lens 18 in this embodiment. The sectors of the field of view are exposed to substantially only one of the detectors in the detector array 16 and are shown in FIG. 1 by A through F along the edge of the projected beam plane 14. The wedge-shaped sectors (seen from the side in FIG. 1) correspond to ones of the photo diodes in the detector array 16 wherein, for example, a projected beam reflected within the sector E will impinge almost entirely on the detector designated E in the array 16.

In FIG. 3 the lens system interposed between the detector array 16 and the reflected beams from the body within the field of view for the detector array 16 is shown where the observation is in a direction orthogonal to that of the diagram of FIG. 1. As may be seen, the objective lens 17 focuses the beam reflections within the field of view and the cylindrical lens 18 focuses the reflected beams within the field of view upon the linear array of detectors 16 which are seen from one end of the array in FIG. 3.

The linear array of discrete energy beam emitters 11 is shown in FIG. 2 projecting the sequentially energized beam emissions 12 toward the projection lens 13 to produce the fan-like pattern of projected beams 14. The manner in which the discrete beam projectors may be energized in predetermined sequence is disclosed in U.S. Pat. No. 4,180,326 issued to Chang in Dec. 1979 for an angle measurement apparatus and currently assigned to the assignee of the invention disclosed herein. With the arrangement of the invention disclosed herein and diagrammed in FIGS. 1-3, the block diagram of FIG. 4 is appropriate for explanation of signal control and processing. As previously explained, the linear array of sequentially energized beam energy emitters 11 is shown projecting a beam 14a toward a body 19 having a surface profile 21. A reflected beam 22 is shown directed toward the linear detector array 16. The reflected beam 22 is within one of the wedge-like sectors A through F as described hereinbefore, and therefore impinges substantially only one of the detectors A through F in the linear array of detectors. The output from the impinged detector in the array is coupled to an amplifier 23 and the amplified detector output is thereafter coupled to an identification portion 24 of the system. A control portion 26 of the system provides for sequentially energizing ones of the energy beam projectors in the projector array 11 in the aforementioned predetermined projection sequence. The control portion 26 also provides indication to the identification portion 24 as to which of the beam energy emitters in the array 11 is projecting a beam at any instance. The identification portion 24 together with a processor 27 provides output which is descriptive of the points in space along the two dimensional profile which is seen as item 21 in FIG. 4.

Returning to FIG. 2 of the drawings, an optical centerline 28 is shown for the projection lens 13. When the direction of projection of the centerline 28 is known, the projection direction of the other beam energy projectors in the projector array 11 is known relative thereto. For example, a direction of projection is shown by the centerline 29 in FIG. 2 for another one of the projectors in the array 11. FIG. 2 also shows the projection of the wedge-like sectors A through F onto the plane 14 within which the energy beams are sequentially projected. A profile 31 is represented in FIG. 2 running through the plane 14. It may be seen that the beam represented by the centerline 29, designated as projected beam number 5 in FIG. 2, impinges on the profile 31 in wedge-like sector D. The identification portion 24 of the disclosed system provides information relating to the portion of FIG. 2 labeled D5 whereby the processor 27 identifies as one point on profile 31 a point lying within the square D5 of FIG. 2. It is apparent that the resolution of the disclosed system may have to be much finer than that shown by way of example in the Figures for the system to be of practical value. It should be noted that the coarse resolution shown in the drawings and described herein is for the purpose of providing a clear explanation of the system. A profile detection system will contain as many points as the number of beam energy emitters and have a depth resolution determined by the area of the field of view divided by the number of detectors or photo diodes in the detector array 16.

The disclosed system can be adapted to the geometry of a vehicle rim and tire assembly for mounting on a wheel balancer as shown in FIGS. 5 and 6 of the drawings. The various parts of the wheel balancer including the safety cover over the rim and tire assembly as it is mounted on the wheel balancer are not shown. Such details are readily available by reference to such disclosures as that contained in U.S. Reissue Pat. No. Re 31,971, reissued in Aug. 1985 for a wheel unbalance measurement method and apparatus assigned to the assignee of the invention disclosed herein. Mounting of the disclosed profile measurement system may be accomplished on the protective cover which is lowered over the tire and rim assembly while the assembly is being spun on the balance for obtaining unbalance information, although such mounting is not critical to the invention, other mounting means on the wheel balancer being just as satisfactory. Therefore, FIG. 5 shows in section a rim 32 with a tire 33 assembled thereon together with the array of beam energy projectors 11 and the projection lens 13. In keeping with the example of the previously described drawings herein, the centerline of six energy beams are shown being emitted by the array 11 and impinging on various parts of the surface of the wheel rim 32 as shown. The wheel rim 32 is seen from the front of the rim in FIG. 6 along a line in the plane of the paper of FIG. 5. The beam energy projector 11 is seen in FIG. 6 together with projection lens 13 whereby the edge of the fan-like array of projected beams 14 is shown much as depicted in FIG. 1. The points of impingement of the projected beams of FIG. 5 are shown in FIG. 6 by the six dots extending vertically in the FIG. The reflection of the beams impinging on these six points in FIG. 6 is shown being directed toward the objective lens 17 and the cylindrical lens 18 to be focused on individual ones (optimally) of the detectors in the detector array 16. The output from the detectors which are impinged by the reflected energy beam provides the wedge-like sector information as described hereinbefore and the signal from the control portion 26 (FIG. 4) provides information as to the identification and therefore the direction of the projected beam as also described hereinbefore. Combination of the identification of both the projected beam and the wedge-like sector in which the beam is received by the detector array 16 defines zones of depth in the field of view. As a result a locus of points (profile) containing the six points in space shown by way of example in FIGS. 5 and 6 is determined. The profile contains as many points as the number of energy beam emitters in the projection array 11 and has a depth resolution equal to the area of the field of view divided by the number of photo diodes in the detector array 16 as previously mentioned. The shape of the profile line may be used for inputting rim dimension information to the wheel balancer which is preliminary to spinning the rim and tire assembly on the wheel balancer for determining its unbalance condition. The location of the rim plane, the diameter of the rim, the presence or absence of unbalance compensation weights on the rim, the location of the tire stem, etc., may all be determined through the use of the disclosed invention and automatically input to the wheel balancer measurement circuits through the use of the invention disclosed herein.

Although the best mode contemplated for carrying out the present invention has been herein shown and described, it will be apparent that modification and variation may be made without departing from what is regarded to be the subject matter of the invention.

What is claimed is:

1. A system for detecting a two dimensional profile on a body within a field of view, comprising a plurality of energy emission means for emitting a plurality of energy emission beams substantially within a plane containing the two dimensional profile, projector lens means interposed between said plurality of energy emission means and the body for focusing the beams in a known fan-like pattern having known diverging projection directions within the field of view, excitation means for individually exiting said plurality of energy emission means in predetermined sequence and for providing a plurality of excitation indicative signals corresponding thereto, said energy beams being reflected by the body upon impingement thereon, a plurality of detector means for receiving said reflected energy beams for each defining discrete field depth sectors within the field of view and for individually receiving reflected energy beams within one of said field depth sectors and providing a plurality of discrete sector signals corresponding to ones of said received reflected energy beams, detector lens means interposed between the body and said plurality of detector means for focusing reflected energy beams within the field of view on said plurality of detector means, and means for receiving said plurality of discrete sector signals and said plurality of excitation indicative signals and for indicating a locus of points having discrete sector and known projection direction characteristics along the body profile within the energy beam emission plane.

2. A profile detection system as in claim 1 wherein said plurality of energy emission means comprises an array of light emitting diodes arranged in a linear array.

3. A profile detection system as in claim 1 wherein said plurality of detector means comprises a line of adjacently mounted photo diodes, the intersections of the known projection directions of said known fan-like pattern of energy emission beams and said field depth sectors defining said locus of points.

4. A two dimensional profile detection apparatus for detecting a body profile within a plane contained in a field of view, comprising a plurality of energy emitting means arranged in linear array and projecting a plurality of individual energy beams within the plane containing the body profile toward the body when energized, emitter lens means for focusing said individual energy beams and for directing said beams in a plurality of unique known directions within a fan-like pattern within the field of view, control means for energizing said plurality of energy emitting means in predetermined sequence and for providing a plurality of individual beam energizing signals corresponding to ones of said energized emitting means, whereby said energy beams impinge said body and are reflected therefrom within said field of view, a plurality of detector means arranged in linear array exposed to the field of view and each individually exposed to a unique field depth sector within the field of view, detector lens means interposed between the body and said plurality of detector means for focusing said individual energy beams reflected from the body onto said linear array of detector means, whereby one of said individual detector means within said plurality thereof which is impinged by one of said reflected individual energy beams from a unique field depth sector produces a discrete detector output signal, and means for conditioning and identifying each of said discrete detector output signals to identify the individual energy beam unique known direction which is reflected from the body and the unique field depth sector from which it is received and for providing intersection data between said energy beams unique known directions and said unique field depth sectors, whereby a locus of points within the plane containing the body profile is identified.

5. A method of detecting a profile on a body within a plane situated within a field of view comprising the steps of projecting a plurality of energy beams within the plane containing the profile toward the field of view from ones of an array of beam projectors in a fan like beam array having unique beam directions and in a predetermined projection sequence, detecting the energy beams reflected from the surface of the body within the field of view with an array of beam detectors, directing the reflected energy beams so that individual ones of the beam detectors in the array receive reflected beam energy from substantially only one field depth sector in the field of view, thereby providing a unique field depth detector output upon receipt of reflected beam energy, identifying the projected beam which is reflected to produce the beam detector output by reference to the predetermined projection sequence, and identifying the field depth sector of impingement within the field of view by reference to the output from the one impinged detector, whereby intersections between ones of said beams having a unique beam direction and ones of said field depth sectors provides a locus of points along the profile within the plane.

6. The method of claim 5 wherein the step of detecting with an array of beam detectors comprises the step of arraying the beam detectors in a straight line.

* * * * *